March 6, 1962   O. D. RATLIFF, JR   3,023,702
ROCKET PROPELLENT IGNITION MEANS
Filed Aug. 23, 1956

INVENTOR.
O. D. RATLIFF JR.
BY Hudson & Young
ATTORNEYS

United States Patent Office 3,023,702
Patented Mar. 6, 1962

3,023,702
ROCKET PROPELLENT IGNITION MEANS
Otho D. Ratliff, Jr., McGregor, Tex., assignor to Phillips Petroleum Company, a corporation of Delaware
Filed Aug. 23, 1956, Ser. No. 605,904
6 Claims. (Cl. 102—70.2)

This invention relates to rocket motors. In one of its aspects it relates to improved igniter means.

A rocket motor such as the type used in assisting the take-off of aircraft (hereinafter termed JATO) comprises a rocket motor casing having an exhaust nozzle positioned at one end and a closure member attached to the other end. A solid propellant, for example, an ammonium nitrate propellant, is positioned within the combustion chamber, which is broadly the space defined by the aft-end of the rocket motor casing containing the exhaust nozzle, the fore-end, i.e. closure member noted above, and the rocket motor casing. A frangible disk, also known to the art as a starter disk, is positioned within said exhaust nozzle, thus closing the opening of the nozzle. The rocket motor also contains ignition means to initiate combustion of the solid propellant. One particular ignition means is an igniter cup assembly containing as easily ignitible material positioned within the combustion chamber, spaced from one end of the propellent charge and centrally located with respect to the cross sectional dimensions of the combustion chamber.

Solid propellent grains are formed in a variety of shapes and sizes such as cylinders, boards, and tubes. The tubular propellent grains are usually burned on the inside and outside simultaneously with only the ends being restricted. With the increased burning area provided in this configuration of propellent charges, ignition of the entire surface has been difficult to obtain and it is desirable that the entire exposed surface be ignited in order for uniform thrust to be obtained from the rocket.

Solid propellants utilized in rockets, such as JATO units, comprise a fuel and an oxidant for oxidizing the fuel. Ammonium nitrate and ammonium perchlorate are often utilized as the oxidant, while the fuel component is usually a hydrocarbon material which acts as a binder for bonding the oxidant particles into a solid grain as well as acting as a fuel. Binder-fuel materials include asphalt, rubber and other tacky organic, e.g. hydrocarbon-containing, materials.

Recently, superior solid propellent materials have been discovered which comprise a major portion of a solid oxidant, such as ammonium nitrate or ammonium perchlorate, and a minor amount of a rubbery binder material, such as copolymer of a conjugated diene and a vinylpyridine or other substituted heterocyclic nitrogen base compound, which after incorporation is cured by a vulcanization reaction. Solid propellent mixtures of this nature and a process for their production are disclosed and claimed in co-pending U.S. application Serial No. 284,447, filed April 25, 1952, now U.S. Patent No. 3,003,861 by W. B. Reynolds and J. E. Pritchard. While it is not intended to so limit the instant invention, it is especially applicable to rocket motors which employ these solid propellent materials.

Various difficulties have been encountered with relation to the particular ignition means employed. The igniter material is rendered inefficient due to damage or contamination by moisture. The igniter material sometimes does not function with a proper ignition delay. In addition, the igniter material may exhibit substantial brisance, that is, upon ignition the igniter composition results in a deleterious shock or explosion. This is very important in that shocks or explosions tend to disintegrate portions of the propellant desired to be ignited and, consequently, uncontrolled burning of the propellant may result.

Accordingly, one or more of the following objects will be achieved by the practice of my invention.

One object of this invention is to provide a novel rocket motor.

Another object of this invention is to provide improved igniter means capable of initiating combustion of a solid propellent grain.

Another object of this invention is to provide improved igniter means wherein the ignitible material is contained within a retiform or netlike cup.

A still further object of this invention is to provide improved igniter means comprising a cup shaped from retiform material covering the ignitible composition, said retiform cup comprising a plastic or wire screen wherein the mesh openings in said screen are covered with a plastic or rubbery material.

Other objects and advantages of my invention will become apparent to those skilled in the art from a consideration of the specification taken in conjunction with the accompanying drawings.

Broadly, my invention is directed to an improved rocket motor containing novel igniter means. The igniter, as will be explained hereinafter, comprises a retiform or netlike cup covering the easily ignitible material within the igniter. The igniter cup is fabricated from a plastic or wire screen wherein the mesh openings are coated with a rubbery or plastic material. The ignition cup can possess a polygonal cross sectional configuration or be of circular cross sectional area and is positioned at one end of the combustion chamber in coaxial alignment with the solid propellant.

The easily ignitible material which is protected and covered by my novel retiform cup may be black powder or a suitable pyrotechnic composition in the form of a powder or small pellets. A desirable igniter composition comprises zirconium-nickel-barium nitrate-potassium perchlorate mixture disclosed in U.S. application Serial No. 592,995 filed June 21, 1956, by L. G. Herring.

The screen forming the outline of the retiform cup can be fabricated from various metals such as nickel, silver, titanium, magnesium, chromium, zirconium, molybdenum, copper, platinum, cobalt, aluminum, nickel, silver, iron, rhodium, platinum, etc., and the like; alloys of various metals, such as the various stainless steels, e.g., austenitic steel, Inconel (high nickel alloy) and other alloys known to the art. The screen can also be woven from various plastics such as nylon,[1] polyethylene, and the like. Various factors, of course, will govern the choice of the particular metal or plastic used and the mesh size desired. Such factors to be taken into consideration are the optimum time of wire burn-out, the composition of the ignitible material, the type, size and formulation of the solid propellant, etc. For example, a retiform cup made ---
[1] Generic name for synthetic fiber-forming polymeric amides having a protein-like chemical structure; trade name of E. I. du Pont Company.

of chromium will remain intact longer than one woven from carbon steel wire cloth. Conversely, a wire mesh of aluminum would burn out much faster. In the same respect, a mesh of plastic, nylon, woven polyethylene or other plastic would burn out even faster than aluminum. The range of wire sizes can vary from very fine wire with fine mesh to a heavy gauge wire and rather coarse mesh. The coarse mesh will be limited by the ability to form a plastic web over the opening. In general, a range of about 1/32" minimum and about 3/8" maximum opening in the mesh is desired. I prefer to employ a carbon steel wire cloth in the fabrication of the retiform cup. For JATO units, a 6 mesh carbon steel wire cloth, 0.035 diameter wire SAE 1010, is particularly suitable.

The wire or plastic screen is coated with a rubbery material such as natural rubber, the various synthetic rubbers, elastomers, plastics and the like. The synthetic rubbers, elastomers, etc., can be prepared in emulsion and mass polymerization processes wherein organic unsaturated compounds, e.g., aliphatic conjugated dienes such as 1,3-butadiene, chloroprene, piperylene, 3-methoxy-1,3-butadiene, methylchloroprene, 2,3-dimethyl-1,3-butadiene, 2,3 - dimethyl - 1,3 - hexadiene, 2 - ethoxy-1,3-ethyl-1,3-hexadiene, 2 - cyano-1,3-butadiene, 2,3-diethyl-1,3-octadiene, and the like are applicable. Copolymers of aliphatic conjugated dienes and a compound containing an active $CH_2=C<$ group and polymerizable therewith are also applicable. The monomers copolymerizable with the aliphatic conjugated dienes are, among others, styrene, α-methylstyrene, 2-methyl-5-vinylpyridine, vinyl-naphthalene, vinylcarbazole p-chlorostyrene, and the like. As those skilled in the rubber art will understand, the conjugated dienes and copolymerizable monomers listed above are given by way of illustration only; this list is definitely not to be interpreted as the sole monomers which are applicable.

The retiform cup can be coated by various techniques known to the art such as the one-step latex dipping process, brushing or painting latex on the cup, etc. followed by an appropriate drying period wherein the water is evaporated and the rubber particles are coalesced as a film on the screen.

In a preferred embodiment of my invention the retiform cup is coated by the two-step dip process. This procedure involves an initial coating of a Tenite MH [2] solution to form a plastic web in the mesh openings of the screen followed, after drying, by a coating of rubber solution which protects the plastic film, i.e. the webs defined by the wire or plastic strands including the strands per se, during handling and shipping. One particular method of effecting the two-step coating process is as follows, understanding of course, that the following coating procedure and coating ingredients are given by way of illustration.

The wire mesh igniter cup is degreased and cleaned by dipping in acetone and subsequently dried. The cup is then immersed in a solution containing 17 weight percent of Tenite MH and 83 weight percent acetone, making sure that complete coverage is obtained. The cup is removed, placed on a rack, ring side down, to drain and dry for approximately three hours at room temperature. The strands forming the outline of a cup are thus coated with Tenite MH, and uniform films of Tenite MH prevail in the web area defined by the strands. The Tenite MH covered cup is now ready for the second half of the dipping process. The cup is immersed in a solution containing 25 weight percent of a rubber compound (formulation set out in Table I) and 75 weight percent toluene, again making certain that complete coverage of the cup is obtained in the solution. The cup is removed, placed on a rack, ring side down, allowed to drain and dry for six hours at room temperature, and cured at 300° F. in a dry oven for 60 minutes. The metal ring and keyslot of the cup are protected in the coating processes by masking the appropriate surfaces with masking tape or by other means. When the two step dipping process is completed, the masking tape or other protective means is removed.

The rubber compound dissolved in the toluene solvent noted above can be prepared from the following compounding recipe set out in Table I below.

TABLE I

| Compound: | Parts by weight |
|---|---|
| Butadiene/MVP [1] (90/10)—Philblack A masterbatch | 100.0 |
| ZNO | 5.0 |
| Stearic acid | 1.0 |
| Philblack A [2] | 60.0 |
| Philrich 5 [3] | 10.0 |
| Flexamine [4] | 2.0 |
| Santocure [5] | 4.0 |
| Methyl Tuads [6] | 2.0 |

[1] 2-methyl-5-vinylpyridine.
[2] Fast extruding furnace black.
[3] Highly aromatic rubber extender and process oil.
[4] A physical mixture containing 65% of a complex diarylamine-ketone reaction product and 35% of N,N'-diphenyl-p-diphenylenediamine.
[5] N-cyclohexyl-2-benzothiazylsulfenamide.
[6] Tetramethyl thiuram disulfide.

The butadiene/MVP is placed on a mill and worked until a smooth band forms. Slowly add the zinc oxide, stearic acid and Flexamine. Any ingredients which fall through the rollers are recovered and put back on the mill. Philblack A is added and the resulting mixture is worked until all the black in incorporated. Slowly add the Philrich 5, thus preventing spillage around the edges of the roll. After all the above ingredients are thoroughly dispersed add the Santocure and Methyl Tuads. When all the ingredients are incorporated, cut and roll the batch for five minutes. The rubber compound is cut in small pieces, added to a proper amount of toluene, and the resulting mixture is agitated until a complete solution is obtained.

The butadiene/2-methyl-5-vinylpyridine copolymer employed in Table I was prepared by emulsion polymerization at 41° F. in accordance with the following recipe:

TABLE II

| Component: | Parts by weight |
|---|---|
| Water | 180 |
| Butadiene | 90 |
| 2-methyl-5-vinylpyridine | 10 |
| Potassium fatty acid soap | 6 |
| KOH | 0.1 |
| KCl | 0.1 |
| Daxad 11 [1] | 0.3 |
| $K_4P_2O_7$ | 0.33 |
| $FeSO_4 \cdot 7H_2O$ | 0.278 |
| Diisopropylbenzene hydroperoxide | 0.214 |
| t-Dodecyl mercaptan | 0.45 |
| *Booster Recipe* | |
| Water | 10.0 |
| $K_4P_2O_7$ | 0.165 |
| $FeSO_4 \cdot 7H_2O$ | 0.139 |
| Diisopropylbenzene hydroperoxide | 0.107 |
| t-Dodecyl mercaptan | 0.45 |

[1] Polymerized sodium salts of alkylnaphthalene sulfonic acid.

The ingredients in the booster recipe were added when 60 percent conversion was reached. The reaction was continued to 88 percent conversion (total reaction time, 25.5 hours). The reaction was shortstopped with 0.5 part, per 100 parts by weight of monomer charged, of Goodrite 3955 (50/50 mixture of sodium dimethyldithiocarbomate and sulfur in the form of sodium polysulfide), and 2 parts of phenyl-beta-naphthylamine, per 100 parts by weight of polymer, was added as the antioxidant.

[2] Cellulose butyrate plastic manufactured by Eastman Chemical Products.

After stripping, the coagulated polymer had a Mooney value (ML-4) of 23.

It is emphatically brought out that my invention is not to be construed as being limited to the above polymer recipe or compounding recipe. Polymer recipes and compounding recipes are well recognized in the rubber art. Nor is solvent to be limited to toluene as the medium in which to dissolve the compounded rubber. The organic solvent is merely limited by the solubility factor of the compounded rubber and to the extent that said solvent does not react with the rubber dissolved therein. Of course, the rubber art is fully apprised of the several compounding means or apparatus for compounding rubber such as the Baker-Perkins blade mixer, Banbury mixer, roll mill and the like.

A more complete understanding of the invention can be obtained by referring to the following description and the drawings, in which.

Figure 1:
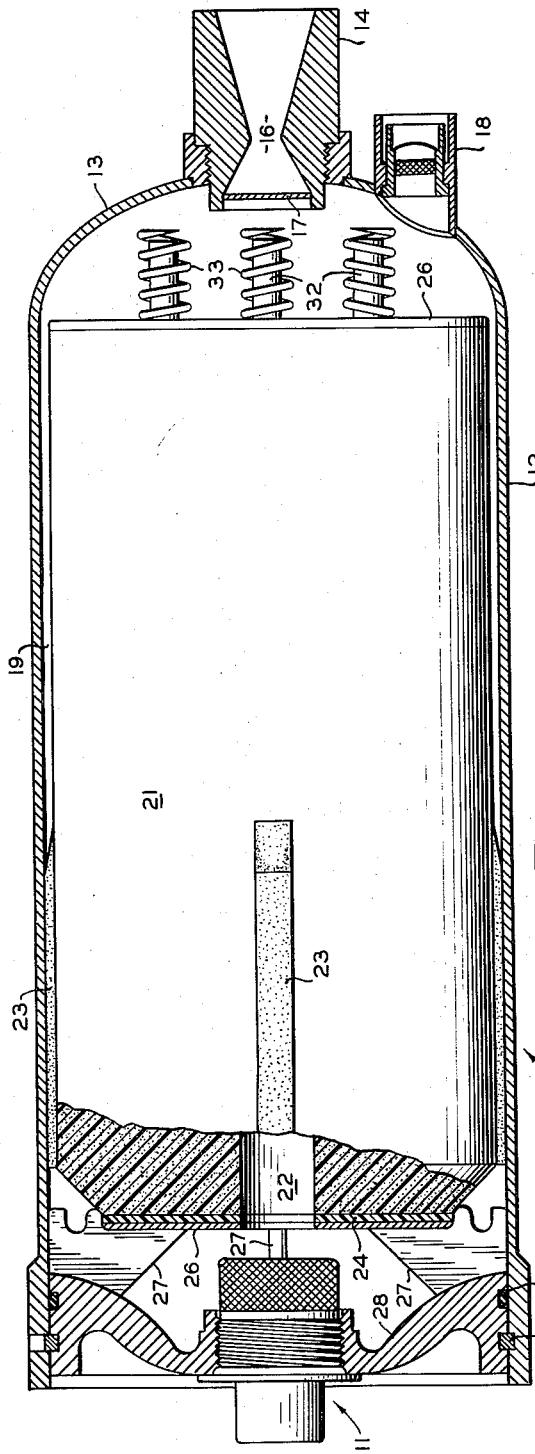
FIGURE 1 is an elevation, partly in section, of a rocket motor which includes the igniter assembly of this invention.

Referring now to FIGURE 1, there is illustrated a rocket motor 10 which includes igniter assembly 11. The rocket motor comprises a cylindrical casing 12 which has a reduced after portion 13 having an axial opening into which an exhaust nozzle 14 is threaded. The nozzle is formed with internal restrictions so as to define a venturi-like passage 16 through which the combustion gases pass. A blow-out diaphragm or disk 17, which covers the inner opening into passage 16, is designed so as to be ejected through the nozzle passage when the chamber pressure reaches a predetermined value. The reduced casing portion of the rocket motor is also provided with a safety plug attachment 18 which is adapted to rupture at a predetermined chamber pressure. By providing for this attachment, the buildup of excessive pressures in the combustion chamber which might rupture the cylindrical casing of the rocket motor is prevented. Any suitable device for releasing excessive pressure can be utilized as is well known to those skilled in the art.

The cylindrical casing defines a combustion chamber 19 in which the solid propellent charge 21 is disposed. The specific propellant charge illustrated is cylindrical in shape and has an outer diameter smaller than the inner diameter of the casing. The propellant is an internal-external burning type by reason of its exposed or unrestricted outer surface and its inner exposed surface which is defined by an axial perforation 22 extending the length of the propellant. A plurality of resilient retaining pads 23, e.g. strips of sponge rubber, are positioned between the head portion of the external burning surface and the adjacent head portion of the casing. The ends of the propellant are restricted by means of a layer of restricting material 24 which has a central opening in alignment with perforation 22. Retaining plates 26 having similar openings cover the outside of the restricting material. Secured to the head retaining plate are outer-extending prongs or legs 27 which are adapted to register with and are held in place by head closure assembly 28 having retention means for igniter assembly 11. Head closure assembly 28 is held in position in the head end of casing 12 by means of key 29 which fits into appropriate grooves formed in the casing and head closure assembly 28. A sealing ring 30 is positioned in a groove cut into assembly 28 to prevent escape of combustion gases from the head end of the casing. The head end of the cylindrical casing is closed by means of head closure assembly 28 in combination with the igniter assembly which is retained in the opening provided in the axial portion of assembly 28. It is noted that the removable cover of the igniter assembly extends through this axial opening.

The aft retaining plate has secured to its outer surface a plurality of prongs 32. The prongs are each surrounded by a compression spring 33 adapted to come into contact with the reduced portion 13 of the casing. The after retaining plate is thereby maintained firmly against the restricting material which covers the after end of the solid propellant.

Figure 2:
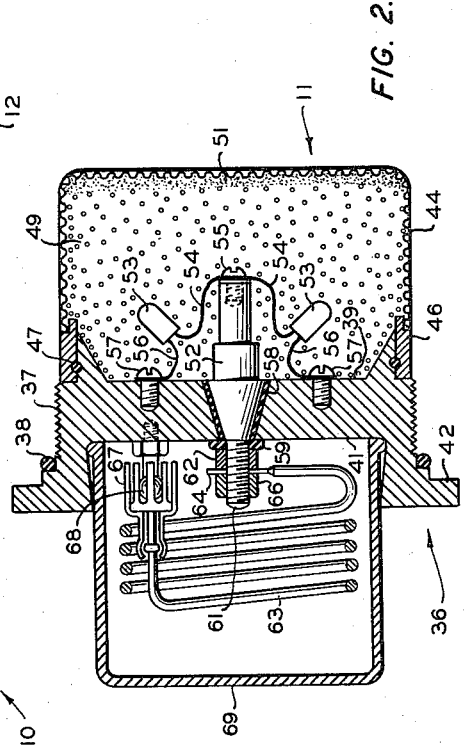
FIGURE 2 is an elevation, partly in section, of a preferred embodiment of the igniter assembly.

Referring now to FIGURE 2 of the drawing, there are illustrated in detail the various elements of igniter assembly 11. The igniter assembly comprises an igniter plug 36 which is provided with external threads 37. As shown in FIGURE 1, these threads provide means for securing the plug in head closure assembly 28 attached to the head end of the rocket motor casing. An O-ring 38, which comes into contact with assembly 28 when the igniter assembly is placed in the rocket motor, furnishes a gas-tight seal for the head end of the motor. The inner and outer faces 39 and 41, respectively, of the igniter plug are countersunk as to form recessed portions or cavities in the ends of the plug. The outer end of the plug is provided with shoulders 42 which are in contact with head closure assembly 28 when the igniter assembly is in position as shown in FIGURE 1. A perforated container 44 is attached to the inner end of the igniter plug. As illustrated, this attachment is accomplished by welding or brazing the container to a ring member 46 which in turn is held in place on the igniter plug by means of wire 47. The perforations or mesh openings in container 44 are closed and the strands are coated by the dipping operation explained previously. An igniter material is disposed within the container. The igniter material is preferably in granular or pelleted form and is held firmly in place within the container by means of a thin layer of material 51, such as cotton, placed in the end of the container. While it is not intended to limit the invention to any particular igniter material, and any suitable material can be utilized, e. g., black powder, an especially useful igniter material is disclosed in copending U. S. application Serial No. 592,995, filed June 21, 1956 by L. G. Herring. As disclosed in the Herring application, the igniter composition is formed of a plurality of discrete pellets comprising powdered metal, powdered oxidizing material, and a binding agent, ethylcellulose.

An electrical conductor or contact member 52 extends through a central portion of plug 37. One end of the contact member terminates exteriorly of the outer face of the plug while the other end extends into the igniter material disposed within container 44. A pair of electrical ignition means 53, which can be squibs, electrical matches, or other suitable ignition means, are disposed within the perforated container in contact with the igniter material therein. Electrical leads 54 which are connected to the squibs are further attached to contact member 52 by means of a bolt 55 threaded into the end of that member. The squibs are grounded to the plug by means of electrical leads 56 which are connected to the igniter plug by means of bolts 57. Contact member 52 is prevented from contacting plug 36 by means of insulating member 58. The outer end of contact member 52 is provided with threads 61 upon which there is threaded a nut 62 for holding in place the contact member as well as insulating member 58. Insulating washer 59 is disposed between outer face 41 of the plug and nut 62 to prevent contact between these two elements. An electrical lead 63 has one of its ends connected to contact member 52 by means of a circular contact 64 which fits over the end of the contact member. Contact 64 is held in place by means of a nut 66 threaded onto the end of contact member 52. The other end of the electrical lead 63 has plug 67 connected thereto to furnish means for connecting the igniter assembly to a source of electrical current. Attached to the outer face of the plug is a ballstud 68 to which plug 67 is attached when disconnected from the source of electrical current. A cover 69 fits into the outer recessed portion of the igniter plug, thereby covering the outer end of contact member 52 and electrical lead 63 connected thereto. When it is desired to place a rocket motor in readiness for firing, cover 69 is removed after which plug 67 is detached from ballstud 68 and plugged into an electrical circuit which includes a source of current, such as a storage battery.

In the operation of the rocket motor shown in the drawing, the motor is armed by removing cover 69 from the igniter assembly and connecting plug 67 of electrical lead 63 into an electrical circuit, not shown, which includes a source of power. Upon closing of a suitable switch, electrical current flows to squibs 53 through electrical lead 63, contact member 52 and electrical lead 54. On being supplied with current, the squibs function in a manner well known in the art to ignite igniter material 49 with which they are in contact.

The igniter material in burning forms hot combustion gases which leave container 44 through the perforations. It is to be understood that the plastic or rubbery material covering the perforations is softened and ruptured upon being contacted with the hot gases; of course, the metallic or plastic screen will thereafter be consumed, i.e. burned out, due to the high temperatures produced in the igniter assembly and/or combustion chamber. The combustion gases resulting from the burning of the igniter material enter combustion chamber 19 of the rocket motor, thereby establishing a desired working pressure therein and initiating the combustion of the burning surfaces of the solid propellant.

It will be apparent that various modifications and variations of the instant invention can be made by one skilled in the art upon consideration of the foregoing disclosure. Such modifications and variations are believed to come within the spirit and scope of the instant invention.

I claim:

1. An igniter assembly for a rocket motor comprising, in combination, an igniter plug having an inner and outer face; a retiform container having a mesh opening in the range from about $\frac{1}{32}$ inch minimum to about $\frac{3}{8}$ inch maximum and attached to the inner end of said plug, said container having a first coating comprising a film of cellulose butyrate plastic and a second coating comprising a film of butadiene/2-methyl-5-vinylpyridine copolymer integral therewith and sealing the mesh openings in said container; igniter material disposed within said container; and means for igniting said igniter material disposed within said container.

2. The apparatus of claim 1 where the retiform container comprises carbon steel wire cloth.

3. The apparatus of claim 1 where the retiform container comprises copper.

4. The apparatus of claim 1 where the retiform container comprises nylon.

5. The apparatus of claim 1 where the retiform container comprises polyethylene.

6. An igniter assembly for a rocket motor comprising, in combination, an igniter plug having an inner and outer face; a retiform container having a mesh opening in the range from about $\frac{1}{32}$ inch minimum to about $\frac{3}{8}$ inch maximum and attached to the inner end of said plug, said container having a first coating comprising a film of cellulose butyrate plastic and a second coating comprising a film of butadiene/2-methyl-5-vinylpyridine copolymer integral therewith and sealing the mesh openings in said container, igniter material disposed within said container; and means for igniting said igniter material disposed within said container comprising an electrical conductor member extending through a central portion of said plug, one end thereof terminating exteriorly of the outer end of said plug and the other end thereof terminating within said container; insulating material surrounding the portion of said conductor member with said plug; electrical ignition means disposed within said retiform container in contact with said igniter material; first electrical conducting means connecting the inner end of said conductor member to said ignition means; second electrical conducting means connecting said ignition means to said plug; and third electrical conducting means connected to the outer end of said conductor member.

References Cited in the file of this patent

UNITED STATES PATENTS

| 542,393 | Meadows | July 9, 1895 |
| 1,377,292 | Thomas | May 10, 1921 |
| 1,862,504 | Calvert | June 7, 1932 |
| 2,424,993 | Meister | Aug. 5, 1947 |
| 2,462,135 | Skinner | Feb. 22, 1949 |
| 2,561,670 | Miller et al. | July 24, 1951 |
| 2,685,837 | Sage et al. | Aug. 10, 1954 |
| 2,703,529 | Tuckerman et al. | Mar. 8, 1955 |

FOREIGN PATENTS

| 817 | Great Britain | Jan. 5, 1884 |